Patented Aug. 14, 1934

1,970,084

UNITED STATES PATENT OFFICE 1,970,084

ELECTRICAL RESISTANCE THERMOMETER

Otto Feussner, Hanau-on-the-Main, Germany, assignor to firm W. C. Heraeus, G. m. b. H., Hanau-on-the-Main, Germany, a corporation of Germany No Drawing. Application August 26, 1931, Serial No. 559,601. In Germany August 26, 1930

4 Claims. (Cl. 201—76)

My invention relates to alloys, and more particularly to alloys suitable to be used as a material for the resistance wires of electrical thermometers.

For the measurement of low and medium temperatures for a long time electrical measuring instruments have been in use, these instruments being especially of the type in which the variation of the electrical resistance of a wire as a function of the temperature is used for the measurement of the latter.

In order to permit easy exchange of the resistance wires and their use in connection with different electrical thermometers, it is necessary that the temperature-coefficient of the electrical conductivity of the resistance wire is of a constant value in every wire manufactured for the present purpose. It is known, that of all metals platinum is to be preferred as a material for resistance wires which serve for the electrical measurement of temperatures, this metal being far superior to others as regards the degree of purity attainable in a wire as well as regards the possibility of exactly reproducing the electrical properties of a wire in all other pieces of wire to be manufactured. This makes possible the substitution of one wire for another.

Platinum, however, has the disadvantage, that it is possessed of certain properties which frequently prevent its use in the form of a resistance wire for electrical thermometers. As a drawback in this respect there may be mentioned in the first place the high price of platinum which necessitates to use resistance wires with a diameter as small as possible in order to reduce the amount of platinum to a minimum. As a consequence of the small diameter, the strength of the current which may be passed through the wire and therewith through the measuring instrument will be limited and in addition to this, an increase of temperature may easily arise at other parts of the instrument, this increase of temperature being a cause for wrong indications of the instrument.

For these reasons metals which are cheaper than platinum but otherwise suitable to serve as a resistance wire in electrical thermometers, such as for instance nickel and iron, had been proposed as a material for the resistance wires of thermometers of this kind, especially with a view of complying with the existing demand as regards an exact and at the same time low-priced electrical thermometer. Resistance wires for electrical thermometers have thus been made from nickel which, besides its property of being of relatively high resistivity in a chemical way, is possessed of a temperature-coefficient about 40% in excess of that of platinum. The higher temperature-coefficient of nickel is certainly a feature much to be desired, but owing to the fact, that it can be obtained only with difficulty with a temperature-coefficient which is uniform throughout, the value of nickel as a material for resistance wires of electrical thermometers is greatly diminished.

Electrical thermometers with a platinum wire as resistance element are being widely used in practice and for this very reason alone it will be greatly desirable to have a resistance wire which consists of some cheaper material permitting insertion of the wire into all types of existing thermometers and to fully retain the thermometer which had originally been calibrated on the basis of a resistance wire of platinum. In case of using a resistance wire of a metal having a higher temperature-coefficient than platinum in connection with a normal electrical thermometer, that is a thermometer which had originally been calibrated on the basis of a platinum wire, a second resistance wire with a temperature-coefficient which is very small with respect to that of platinum had ordinarily been connected in parallel to the former wire, in order to provide a compensation for its higher temperature-coefficient. By reason of the fact, however, that the temperature-coefficient of the resistance wire in different thermometers could never be made to exactly agree with the thermometer, it had been necessary to individually adjust the aforementioned second resistance wire with respect to its temperature-coefficient to attain proper compensation.

This procedure, however, can only be carried out at the expense of time and, besides, did not give a satisfactory result. Moreover, theoretical considerations will show that it is only possible to properly adjust the two resistance wires to attain the desired compensation only for two definite temperature values, while the errors of indication at intermediate temperatures will increase with increasing interval between said two definite temperature values.

Another possibility of attaining the desired goal consists in using resistance wires of alloys having a temperature-coefficient which is equal to the temperature-coefficient of the platinum throughout the range of temperatures which come into consideration. A resistance wire made of an alloy of this kind may immediately be used instead of the platinum wire without necessitating any scheme of compensation.

Now, I have found that the aforementioned goal may be arrived at by providing an alloy having components which fulfill a number of conditions. In the first place care must be taken that the components of the alloy in their chosen proportion are completely miscible with each other, that is to say, that said components form miscible crystals; in the second place the distance between the "solidus" and "liquidus" melting curves must be as small as possible, and, besides, the curve must be of a conformation indicating that the constituency of the primary crystallization differs as little as possible from the constituency of the remainder of the fused material. Besides, the components of the alloy must be distinguished by the property that diffusion between the components takes place as easily and as quickly as possible. If care is taken to observe the aforegiven prescription for the characteristics of the components, it is possible to make alloys which are possessed of a temperature-coefficient which is constant within wide limits during one and the same process of fusing and which, in addition, is also practically constant during transit from one to another process of fusing. As an alloy which is especially well suited as a material for resistance wires of electrical thermometers, the combination of gold with silver may be mentioned. By alloying silver with 0.46% of gold there will be obtained an alloy which is possessed of all the forementioned characteristics, viz: having a temperature-coefficient which is exactly equal to that of the platinum, being suitable for temperatures up to from 300–400° C., quite essentially cheaper than platinum and at the same time possessed of a resistivity in a chemical way sufficient to comply with all requirements to be made in connection with normal electrical temperature measuring instruments.

It is extremely desirable that the alloy in order to be suitable for the present purpose viz: to serve as a resistance wire for electrical thermometers consist to the greatest extent of a single component to which the other, additional components are added in the necessary quantities. In general, the amount of gold is not greater than 10% of the entire alloy. It is desirable to use said other or additional components in quantities not substantially greater than 10% of the entire alloy, because in this case the formation of the alloy will take place relatively easily. From the above, it will be seen that the silver is always by far the major part of the alloy. The gold is not substantially more than 10%, and the other metals not more than 10% of the entire alloy. Thus the gold is between about 10/90 and 0.46/99.54 of the silver. The other metals are between 0 and about 10% of the entire alloy. For this reason it is preferable to use as the main component of the alloy an element which according to the present state of the art may easily be produced in condition of greatest purity. The term "wire" as used herein, is not intended to be limited to a metal piece having any particular shape of cross-section.

I claim:

1. An electrical resistance element of an electrical resistance thermometer, said element being in the form of a wire composed of an alloy having an electrical conductivity similar to that of metallic platinum at various given temperatures within the temperature range for which the thermometer is calibrated, such resistance wire being formed of an alloy containing silver and gold as its characteristic constituents, in which the ratio of silver to gold is between 90:10 and 99.54:0.46, any metals other than silver and gold in said resistance wire being below 10% of the whole alloy.

2. An electrical resistance element of an electrical resistance thermometer, said element being in the form of a wire composed of an alloy having electrical conductivities similar to that of metallic platinum at various given temperatures within the temperature range for which the thermometer is calibrated, such resistance wire being formed of an alloy containing silver and gold alloy as its characteristic constituent in which alloy the silver and gold together amounts to at least 90% of the entire alloy, and in which the gold is between about 0.46% and about 10% of the combined silver and gold constituent, and metals other than silver and gold in said resistance wire being below 10% of the whole alloy.

3. An electrical resistance element of an electrical resistance thermometer, said element being in the form of a wire composed of an alloy having electrical conductivities similar to that of metallic platinum at various given temperatures within the temperature range for which the thermometer is calibrated, such resistance wire being formed of an alloy containing at least 90% of silver and gold and in which the amount of gold is between about 0.46% and about 10% of the total gold and silver present.

4. An electrical resistance element of an electrical resistance thermometer, composed of an alloy containing about 99.54% of silver and about 0.46% of gold.

OTTO FEUSSNER.